United States Patent [19]
Boutier et al.

[11] Patent Number: 5,948,843
[45] Date of Patent: *Sep. 7, 1999

[54] LITHOGRAPHIC INK

[75] Inventors: Robert H. Boutier, Warminster; Bruce K. McEuen, East Whiteland Twp., both of Pa.; Michael F. Heilman, Charleston Twp., Mich.

[73] Assignee: Elf Atochem North America, Inc., Philadelphia, Pa.

[*] Notice: This patent is subject to a terminal disclaimer.

[21] Appl. No.: 08/656,002

[22] Filed: May 24, 1996

Related U.S. Application Data

[63] Continuation-in-part of application No. 08/479,278, Jun. 7, 1995, Pat. No. 5,811,481.

[51] Int. Cl.$^6$ ........................................... C08L 91/00
[52] U.S. Cl. .................. 524/313; 524/474; 524/484; 524/490; 524/513; 524/508; 525/135.5; 525/327.7
[58] Field of Search .................. 224/313; 525/329.7, 525/384, 133.5; 524/484, 474, 508, 490, 513

[56] References Cited

U.S. PATENT DOCUMENTS

| | | | |
|---|---|---|---|
| 2,454,284 | 11/1948 | Kirk | 525/327.7 |
| 2,570,846 | 10/1951 | Otto et al. | 525/327.7 |
| 2,676,934 | 4/1954 | Butler | 525/327.7 |
| 2,967,162 | 1/1961 | Vasta | 525/327.7 |
| 2,977,334 | 3/1961 | Zopf, Jr. et al. | 525/327.7 |
| 3,388,106 | 6/1968 | Muskat | 525/327.7 |
| 3,563,937 | 2/1971 | Nickerson | 525/327.7 |
| 3,838,087 | 9/1974 | Pirck et al. | 525/327.7 |
| 3,943,111 | 3/1976 | Fritze et al. | 525/327.7 |
| 4,079,102 | 3/1978 | Wagner et al. | 260/879 |
| 4,391,721 | 7/1983 | Pappas | 252/51.5 |
| 4,601,863 | 7/1986 | Shioi et al. | 264/4.3 |
| 4,670,516 | 6/1987 | Sackmann et al. | 525/327.7 |
| 4,963,188 | 10/1990 | Parker | 525/327.7 |
| 5,516,853 | 5/1996 | Schneider et al. | 525/327.7 |

FOREIGN PATENT DOCUMENTS

| | | | |
|---|---|---|---|
| 077594 | 9/1985 | European Pat. Off. | |
| 2338642 | 3/1975 | Germany | 525/327.7 |
| 56-62809 | 5/1981 | Japan . | |
| 991908 | 5/1965 | United Kingdom | 525/327.7 |

*Primary Examiner*—Judy M. Reddick
*Attorney, Agent, or Firm*—Seidel, Gonda, Lavorgna & Monaco, PC

[57] ABSTRACT

A lithographic printing ink contains an ester-modified carboxyl-containing copolymer as a pigment dispersant. The ester-modified carboxyl-containing copolymer is the reaction product of a long chain alcohol and a styrene maleic anhydride copolymer, wherein at least 35% of the carboxyl groups of the styrene maleic anhydride copolymer are esterified. The ink further includes a liquid carrier resin; a pigment; and a solvent selected from the group consisting of aliphatic hydrocarbons, aromatic hydrocarbons, and mixtures thereof and/or a modifying oil. The pigment dispersants improve color development when incorporated into the ink during the grinding stage.

18 Claims, No Drawings

LITHOGRAPHIC INK

This is a continuation-in-part of patent application Ser. No. 08/479,278 filed Jun. 7, 1995 now U.S. Pat. No. 5,811,481.

FIELD OF THE INVENTION

The present invention is directed to a lithographic printing ink containing an additive that provides improved pigment dispersion and color development, more particularly, to a lithographic printing ink containing an additive that is the product of an esterification reaction of a carboxyl containing copolymer with a long chain alcohol, and a process for preparing the ink.

BACKGROUND OF THE INVENTION

Printing inks are mixtures of coloring agents dispersed or dissolved in a liquid vehicle or carrier, which forms a paste that can be printed on a substrate and dried. Printing inks may, in general, be divided into four classes: 1) letterpress; 2) lithographic; 3) flexographic; and 4) rotogravure. A varnish is a resinous solution that is spread on wood or metal surfaces to provide a hard, lustrous, generally transparent coating for protection.

Lithographic printing inks are used in a number of printing processes, such as offset lithography, in which the image areas of a plate are treated to accept greasy inks and repel water, while the nonimage areas of the plate accept water and repel ink. A lithographic printing ink is preferably soluble in organic solvents and strongly hydrophobic.

Typically, the coloring agents used in inks are pigments, toners, and dyes, or combinations thereof. Coloring agents provide contrast against a substrate background on which the inks are printed. A liquid resin is frequently used as a vehicle or carrier for the coloring agents during printing operations, and, in most cases, serves to bind the coloring agents to the substrate. One of the most important functions of the liquid resin carrier is to promote pigment dispersion.

The traditional practice in the field of lithographic ink formulation has been to combine a linseed oil with an alkyd resin or phenolic resin in order to improve pigment dispersion. Sulfonated castor oil and naphthenic soaps have also been used for this purpose, but to a lesser extent. Past efforts to modify resins in order to enhance pigment dispersion have been unsuccessful. The efforts to modify resins taken to date have resulted in resins that exhibit improved pigment dispersion, but also exhibit reduced hydrophobicity. Accordingly, there is a need for an additive for lithographic printing inks that improves pigment dispersion without adversely affecting the hydrophobicity of the resin carrier.

SUMMARY OF THE INVENTION

The present invention is directed to a lithographic printing ink containing an additive that improves pigment dispersion and color development and a process for preparing the improved lithographic printing ink. The lithographic printing ink composition includes as a dispersant, an ester modified carboxyl containing copolymer. The ester modified carboxyl containing copolymer is a reaction product of a long chain alcohol and a styrene maleic anhydride copolymer, wherein at least about 35% of the carboxyl groups of the styrene maleic anhydride copolymer are esterified to form the reaction product. The ink further includes a solvent selected from the group consisting of aliphatic hydrocarbons, aromatic hydrocarbons, and mixtures thereof, and/or a modifying oil, such as those derived from animal oils, vegetable oils, and mixtures thereof. A liquid carrier resin and a pigment are also provided in the printing ink.

In a preferred process for making the improved lithographic printing ink, a styrene maleic anhydride copolymer is reacted with a long chain alcohol to produce a reaction product. At least about 35%, more preferably about 40%, of the carboxyl groups of the styrene maleic anhydride copolymer are esterified to form the reaction product. In a most preferred process, approximately 50% of the carboxyl groups of the styrene maleic anhydride copolymer are esterified to form the reaction product. The reaction product is then combined with a solvent and/or modifying oil to form a relatively thick solution. Liquid resin carrier and pigment are then introduced into the thick solution. The resulting solution is ground and subsequently diluted with additional solvent and/or modifying oil to produce a lithographic printing ink with improved pigment dispersion.

DETAILED DESCRIPTION OF THE INVENTION

The present invention is a lithographic printing ink having an additive wherein the lithographic printing ink exhibits improved pigment dispersion without the loss of hydrophobicity and improved color development. The improved lithographic printing ink contains an ester modified carboxyl-containing copolymer dispersant, a hydrocarbon solvent and/or modifying oil, a liquid resin carrier, and various coloring agents or pigments, as dictated by need. One advantage that results from incorporating a dispersant into a lithographic printing ink is that the time required for grinding and dispersing coloring agents is significantly reduced. Additionally, the quantity of pigment that must be incorporated into the resulting lithographic printing ink is also reduced without a loss in the tone, clarity, or depth of the coloring. A dispersant, as used in the present invention, that provides greater tone, depth, and clarity without increasing the viscosity of an ink is a significant advance.

The carboxyl containing copolymer used in the present invention to prepare the dispersant is preferably prepared by polymerizing predetermined proportions of maleic anhydride and styrene monomer to produce styrene maleic anhydride copolymers. The molar ratio of styrene monomer to maleic anhydride is preferably from about 3:1 to about 1:1. More preferably, a molar ratio of approximately 3:1 is used. These substantially amorphous copolymers are commonly available or prepared by well-known polymerization techniques.

The preferred styrene maleic anhydride copolymers contemplated for practicing the present invention are characterized by having a number average molecular weight of less than 2000, relatively high melting temperatures, high thermal stability, and high melt viscosities. Examples of preferred styrene maleic anhydride copolymers, listed in descending order of preference, are SMA 3000, SMA 2000, and SMA 1000, which are commercially available from Elf Atochem North America, Inc., Philadelphia, Pa.

SMA 1000 is a copolymer prepared from a mixture of styrene monomer and maleic anhydride having a molar ratio of approximately 1.1 moles of styrene monomer to approximately 1 mole of maleic anhydride. SMA 1000 has a softening range from approximately 150° C. to approximately 170° C., a glass transition temperature of approximately 154° C., an acid number of approximately 465 to 495.

SMA 2000 is a copolymer prepared from a mixture of styrene monomer and maleic anhydride having a molar ratio of approximately 2 moles of styrene for every mole of maleic anhydride. SMA 2000 has a softening range from approximately 140° C. to approximately 160° C., a glass transition temperature of approximately 124° C., an acid number of approximately 335 to 375.

SMA 3000 is a copolymer prepared from a mixture of styrene monomer and maleic anhydride having a molar ratio of approximately 3 moles of styrene monomer for every mole of maleic anhydride. SMA 3000 has a softening range from approximately 115° C. to approximately 130° C., a glass transition temperature of approximately 125° C., an acid number of approximately 265 to 305. SMA 3000 is the most preferred copolymer because its esterification product exhibits the highest levels of solubility in hydrocarbon and oil solvents commonly used in formulating lithographic printing inks.

Carboxyl-containing copolymers, such as styrene maleic anhydride copolymer, are substantially amorphous solids which are relatively insoluble in aliphatic hydrocarbons and oils. In order to increase its solubility, the carboxyl containing copolymer is reacted with a long chain alcohol in an esterification reaction. The ester modified carboxyl containing copolymer additive must contain in ester form, a solubility improving amount of a $C_6$ or greater aliphatic alcohol, preferably a $C_{10-22}$ alcohol or mixtures thereof, more preferably a $C_{12-18}$ alcohol, or mixtures thereof. The esterification products of alcohols having less than about six carbon atoms do not exhibit sufficient solubility in aliphatic hydrocarbons or oils for purposes of the present invention. Since the copolymer product of the esterification reaction described below must remain in solution to provide the desired improved pigment dispersion, alcohols having less than six carbon atoms are not preferred reactants in the esterification reaction.

Alcohol compounds which may be reacted with the carboxyl-containing copolymers to form the ester functions include $C_6$ or greater primary, secondary, and tertiary alcohols, including hexanol, isohexanol, 2-ethylhexanol, t-octanol, isooctanol, decanol, octadecanol (lauryl alcohol), tetradecyl alcohol, cetyl alcohol, oleyl alcohol, stearyl alcohol. The most preferred alcohols are oleyl alcohol and stearyl alcohol. These alcohols are well known and are commonly made by a variety of processes, including the "oxo" alcohol process or hydroformylation.

A preferred method for producing the ester modified carboxyl-containing copolymer additive for use in the present invention is by reacting a long chain alcohol, most preferably $C_{12}$ to $C_{18}$, with a carboxyl-containing copolymer, such as styrene maleic anhydride copolymer, in a reaction vessel at an elevated temperature. In the making of lithographic printing inks, the ester modified carboxyl-containing copolymer additive is then dissolved in solvent and/or modifying oil. Coloring agents and a liquid carrier resin are then combined with the mixture. The resulting mixture is then ground to produce a pigment dispersion. The pigment dispersion is subsequently diluted with additional solvent and/or modifying oil to produce a lithographic printing ink.

In the esterification reaction, a long chain alcohol is introduced into a reaction vessel maintained by an external heat source at a slightly elevated temperature between 40° C. and 70° C. If the long chain alcohol is amorphous at room temperature, it is allowed to melt prior to introducing any additional components into the reaction vessel. The alcohol component is maintained at the elevated temperature while a carboxyl-containing copolymer, preferably styrene maleic anhydride, is slowly introduced into the reaction vessel. The long chain alcohol component is preferably contacted with between 1.3 and 0.9 molar equivalents, more preferably 1.1 and 0.95 molar equivalents, of the carboxyl-containing copolymer. Preferably, at the conclusion of the esterification reaction, at least approximately 35%, more preferably approximately 50%, of the carboxyl groups on the carboxyl-containing copolymer are esterified to form the reaction product.

As the carboxyl-containing copolymer is introduced into the reaction vessel, the reaction vessel is continuously heated by the external heat source to an elevated temperature between 140° C. and 180° C., more preferably approximately 170° C. The esterification reaction between the long chain alcohol and the carboxyl-containing copolymer proceeds at the elevated temperature. Depending on the purity, concentration, temperature, and other reaction conditions, the esterification reaction may take from 30 minutes to 12 hours, more preferably between 1 to 3 hours. Common esterification catalysts may optionally be used to promote the esterification reaction. Examples of common esterification catalysts include sulfuric acid, sulfonic acid, and lithium acetate. The esterification conditions described above are well known to those skilled in the art. The product of the esterification reaction may be stripped of any volatile materials or excess alcohol at the conclusion of the esterification reaction.

Suitable solvents for use in lithographic printing inks are well known to those skilled in the art. Examples of solvents that may be used in lithographic printing inks are high boiling aliphatic hydrocarbons typically containing greater than 10 carbon atoms, aromatic hydrocarbons, and mixtures thereof. A preferred solvent is an aliphatic hydrocarbon oil, such as a high boiling technical grade white oil containing 14 carbons and higher and having a molecular weight of about 200–250. One such available solvent is Magie 470 Oil, available from Magie Brothers. Examples of modifying oils are vegetable oils, animal oils, and mixtures thereof. A preferred modifying oil is linseed oil. Liquid carrier resins are well known to those skilled in the art. Examples of suitable liquid resin carriers are alkyd resins or phenolic resins.

Lithographic inks with alkyd resins may optionally contain driers to promote oxidative crosslinking or drying of the ink film. Examples of suitable driers are salts of metals and unsaturated organic acids such as cobalt naphthenate, cobalt octoate, lead octoate, and zinc octoate. Metals contained in salts used as driers are generally metals with a valence of two or greater such as cobalt, manganese, cerium, lead, chromium, iron, nickel, uranium and zinc.

Pigments are incorporated into a lithographic ink in order to provide contrast against a substrate on which the ink is placed. Examples of pigments that may be provided in a lithographic printing ink are titanium dioxide, carbon black, zinc oxide, lead titanate, potassium titanate, antimony oxide, lithopone, phthalocyanine blue, quinacridone, ferric hydrates, Lithol Rubine, and the like. Lithol Rubine is a red pigment which is the calcium salt of an azo pigment made by diazotizing p-toluidine-m-sulfonic acid and coupling with 3-hydroxy-2-naphthoic acid. The tone, depth, and clarity of the color contrast increases as the amount of pigment incorporated into the lithographic ink is increased. Similarly, the viscosity of a lithographic printing ink increases as the amount of pigment is increased. At a certain point, the viscosity of a lithographic printing ink may be too high to be commercially feasible, which effectively limits the amount of pigment that may be provided in a lithographic ink.

Examples of suitable pigment to carrier resin ratios that may be provided in a lithographic printing ink containing carbon black, lithol rubine and titanium dioxide pigments are 0.33:1.0, 0.30:1.0 and 0.5:1, respectively.

In order to prepare a lithographic printing ink having improved pigment dispersion, a predetermined quantity of the ester modified copolymer dispersant is combined with a predetermined quantity of a hydrocarbon solvent and/or modifying oil. The ester modified copolymer dispersant is initially preferably combined with a modifying oil to form a solution wherein the weight fraction of the ester modified copolymer dispersant is from approximately 10% to approximately 50%, more preferably approximately 30%. Solutions having greater than approximately 50% by weight of the ester modified copolymer dispersant are difficult to fully dissolve. The ester modified copolymer dispersant and modifying oil solution is then combined with additional modifying oil and/or solvent, coloring agents and liquid resin carriers. The resulting mixture is ground to produce a pigment dispersion and subsequently diluted with additional solvent and/or modifying oil to produce a lithographic printing ink with improved pigment dispersion.

The weight ratio of modifying oil to pigment in the pigment dispersion is preferably in the range of approximately 2:1 to 0.5:1, more preferably approximately 1:1. The weight ratio of pigment to additive in the pigment dispersion is preferably in the range of approximately 300:1 to 50:1, more preferably from 200:1 to 75:1, most preferably approximately 100:1. Pigment dispersions are commonly diluted or adjusted by end users with liquid resins, solvents, and/or modifying oils in order to produce a lithographic printing ink having a desired viscosity. The desired viscosity of any particular lithographic printing ink is dependent on the characteristics of the printing equipment and printing substrate.

A well established practice for determining the uniformity and fineness of a pigment dispersion in an ink formulation is ASTM D-1210-79 entitled Standard Test for Fineness of Dispersion of Pigment-Vehicle Systems. This test method measures the degree of dispersion of a pigment in a pigment-vehicle system. An ink having a uniform dispersion of fine particles typically has a reading on the Hegman scale of approximately 6.5 to 7.5. An ink having a poorly dispersed mixture of particles typically has a reading on the Hegman scale in the vicinity of 1 or 2. A National Printing Ink Research Institute (NPIRI) gauge is another type of gauge for measuring the fineness of pigment grinds. In the ink industry, it is more commonly used than the Hegman gauge. Most commercial lithographic inks should have a reading on the Hegman scale above 7.5 or a reading of less than 2 on the NPIRI scale.

Preparative Examples 1 and 2 illustrate a preferred procedure for preparing the ester modified carboxyl containing copolymer, which acts as a dispersant in the present invention. Examples 3 through 10 illustrate preferred procedures for preparing the present invention in which the dispersants have been made in similar, but not necessarily identical fashion, to the procedures described in Preparative Examples 1 and 2.

Examples 3 through 6 illustrate the formulation of pigment dispersions with a variety of preferred dispersants in which the pigment was carbon black. Examples 7 through 10 illustrate the formulation of pigment dispersions with a variety of preferred dispersants in which the pigment was titanium dioxide. Comparative Examples 1 and 2 illustrate the formulation of pigment dispersions not having dispersants provided therein in which the pigments are carbon black and titanium dioxide, respectively.

In accordance with the procedures outlined in ASTM-D-1210-79, the pigment dispersion formulations described below were spread by means of a scraper along a calibrated tapered path. A Hegman scale, numbered from 1 to 8, was provided along the length of the tapered path. As the printing ink formulations were spread along the tapered path, particles in the ink formed a discernable pattern. A direct reading from the Hegman scale was then made at the point where the particles formed the discernable pattern. The results of the observations are tabulated below in Table I, entitled Carbon Black Coloring Agent, and Table II, entitled Titanium Dioxide Coloring Agent.

PREPARATIVE EXAMPLE 1

1044 grams of liquid oleyl alcohol (melting point $-7.5°$ C., boiling point $195°$ C. at 8 torr) was weighed into a 5 liter reaction vessel. The reaction vessel was heated using an external heat source to approximately $170°$ C. while the alcohol contained in the vessel was continuously stirred. 956 grams of SMA 1000 was slowly introduced into the reaction vessel using a powder funnel while maintaining the reaction vessel at $170°$ C. The reaction vessel was continuously maintained at $170°$ C. for 2 hours at which time the external heat source was removed. The reactor vessel was disassembled and, using insulated gloves, the molten mixture was poured onto an aluminum foil covered tray to cool to form an ester modified copolymer product.

PREPARATIVE EXAMPLE 2

1048 grams of solid crystal stearyl alcohol (melting point $59°$ C., boiling point $210°$ C. at 15 torr) was weighed into a 5 liter reaction vessel. The reaction vessel was slowly heated using an external heat source to $60°$ C. to melt the stearyl alcohol in the reaction vessel. 952 grams of SMA 1000 was then slowly introduced into the reaction vessel using a powder funnel while maintaining the reaction vessel at $60°$ C. The reaction vessel was then heated to and maintained at approximately $170°$ C. for 2 hours. After the external heat source was removed, the reactor vessel was disassembled and, using insulated gloves, the molten mixture was poured onto an aluminum foil covered tray to cool to form an ester modified copolymer product.

EXAMPLE 3

1.17 grams of a 30% by weight solution of an esterification product of SMA 1000 and oleyl alcohol in boiled linseed oil were combined with 50 grams of boiled linseed oil. 50 grams of linseed alkyd resin, 35 grams of Raven 1200, a carbon black coloring agent, and 100 grams of ceramic beads were then introduced into the mixture to form a pigment dispersion designated hereinafter as 178-2. Pigment dispersion 178-2 was ground in known fashion and periodically subjected to a Hegman Grind analysis according to ASTM D-1210-79.

EXAMPLE 4

1.17 grams of a 30% weight solution of an esterification product of SMA 3000 and oleyl alcohol in boiled linseed oil were combined with 50 grams of boiled linseed oil. 50 grams of linseed alkyd resin, 35 grams of Raven 1200, a carbon black coloring agent, and 100 grams of ceramic beads were then introduced into the mixture to form a pigment dispersion designated hereinafter as 178-3. Pigment dispersion 178-3 was ground in known fashion and periodically subjected to a Hegman grind analysis according to ASTM D-1210-79.

EXAMPLE 5

1.17 grams of a 30% weight solution of an esterification product of SMA 1000 and stearyl alcohol were combined with 50 grams of boiled linseed oil. 50 grams of linseed alkyd resin, 35 grams of Raven 1200, a carbon black coloring agent, and 100 grams of ceramic beads were then introduced into the mixture to form a pigment dispersion designated hereinafter as 178-4. Pigment dispersion 178-4 was ground in known fashion and periodically subjected to a Hegman grind analysis according to ASTM D-1210-79.

EXAMPLE 6

1.17 grams of a 30% weight solution of an esterification product of SMA 3000 and stearyl alcohol were combined with 50 grams of boiled linseed oil. 50 grams of linseed alkyd resin, 35 grams of Raven 1200, a carbon black coloring agent, and 100 grams of ceramic beads were then introduced into the mixture to form a pigment dispersion designated hereinafter as 178-5. Pigment dispersion 178-5 was ground in known fashion and periodically subjected to a Hegman grind analysis according to ASTM D-1210-79.

Comparative Example 1

50 grams of boiled linseed oil, 50 grams of linseed alkyd resin, 35 grams of Raven 1200, a carbon black coloring agent, and 100 grams of ceramic beads were combined in a vessel to form a pigment dispersion designated hereinafter as Control-1. Pigment dispersion Control-1 was ground in known fashion and periodically subjected to a Hegman Grind analysis according to ASTM D-1210-79.

EXAMPLE 7

140 grams of soya fatty acid and 45 grams of glycerine was placed into a reaction vessel and the reaction vessel was fitted with distillation glassware. The reaction vessel and the distillation glassware were wrapped with glass wool. Nitrogen flow was initiated to purge the reaction vessel. The reaction vessel was heated using an external heat source to approximately 240° C. while the contents of the vessel were continuously stirred. As the reaction proceeded, the quantity of water recovered in the receiving flask was continuously monitored. When approximately 3.0 grams of water had been collected, the nitrogen purge was temporarily removed. 37 grams of phthalic anhydride was added to the reaction vessel via a powder funnel and the nitrogen purge was resumed. Additional water was collected in the receiving flask until the reaction was completed. When the contents of the vessel reached 240° C., the external heat source was removed. The contents of the reaction vessel were cooled to less than 100° C. The resulting product was yellow/brown in color, and transparent. The product was designated as Soya Alkyd 157A, transferred to a jar and utilized in the preparation of the pigment dispersions of Examples 7–10 and Comparative Example 2.

1.67 grams of a 30% weight solution of an esterification product of SMA 1000 and oleyl alcohol were combined with 25 grams of boiled linseed oil. 25 grams of Soya alkyd resin 157A, and 50 grams of TiPure R960-48HG, a titanium dioxide coloring agent, were then introduced into the mixture to form a pigment dispersion designated hereinafter as 170-2. Pigment dispersion 170-2 was ground in known fashion and periodically subjected to a Hegman Grind analysis according to ASTM D-1210-79.

EXAMPLE 8

1.67 grams of a 30% weight solution of an esterification product of SMA 3000 and oleyl alcohol were combined with 25 grams of boiled linseed oil. 25 grams of Soya alkyd resin 157A, and 50 grams of TiPure R960-48HG, a titanium dioxide coloring agent, were then introduced into the mixture to form a pigment dispersion designated hereinafter as 170-3. Pigment dispersion 170-3 was ground in known fashion and periodically subjected to a Hegman Grind analysis according to ASTM D-1210-79.

EXAMPLE 9

1.67 grams of a 30% weight solution of an esterification product of SMA 1000 and stearyl alcohol were combined with 25 grams of boiled linseed oil. 25 grams of Soya alkyd resin 157A, 50 grams of TiPure R960-48HG, a titanium dioxide coloring agent, were then introduced into the mixture to form a pigment dispersion designated hereinafter as 170-4. Pigment dispersion 170-4 was ground in known fashion and periodically subjected to a Hegman Grind analysis according to ASTM D-1210-79.

EXAMPLE 10

1.67 grams of a 30% weight solution of an esterification product of SMA 3000 and stearyl alcohol were combined with 25 grams of boiled linseed oil. 25 grams of Soya alkyd resin 157A, 50 grams of TiPure R960-48HG, a titanium dioxide coloring agent, were then introduced into the mixture to form a pigment dispersion designated hereinafter as 170-5. Pigment dispersion 170-5 was ground in known fashion and periodically subjected to a Hegman Grind analysis according to ASTM D-1210-79.

Comparative Example 2

25 grams of boiled linseed oil, 25 grams of Soya alkyd resin 157A, and 50 grams of TiPure R960-48HG, a titanium dioxide coloring agent, were combined in a vessel to form a pigment dispersion designated hereinafter as Control-2. Pigment dispersion Control-2 was ground in known fashion and periodically subjected to a Hegman Grind analysis according to ASTM D-1210-79.

TABLE I

CARBON BLACK COLORING AGENT

| Pigment dispersion | | Hegman Units | Time (min.) |
|---|---|---|---|
| 178-2 (Example 3) | - | 6.3 | 5 |
| 178-3 (Example 4) | - | 5.5 | 5 |
| 178-4 (Example 5) | - | 6.3 | 5 |
| 178-5 (Example 6) | - | 8.0 | 5 |
| Control-1 (Comparative 1) | - | 3.0 | 5 |
| 178-2 (Example 3) | - | 8.0 | 10 |
| 178-3 (Example 4) | - | 8.0 | 10 |
| 178-4 (Example 5) | - | 8.0 | 10 |
| 178-5 (Example 6) | - | 8.0 | 10 |
| Control-1 (Comparative 1) | - | 3.5 | 10 |
| 178-2 (Example 3) | - | 8.0 | 15 |
| 178-3 (Example 4) | - | Not measured[1] | 15 |
| 178-4 (Example 5) | - | Not measured | 15 |
| 178-5 (Example 6) | - | Not measured | 15 |
| Control-1 (Comparative 1) | - | 4.5 | 15 |
| 178-2 (Example 3) | - | Not measured | 20 |
| 178-3 (Example 4) | - | Not measured | 20 |
| 178-4 (Example 5) | - | Not measured | 20 |
| 178-5 (Example 6) | - | Not measured | 20 |
| Control-1 (Comparative 1) | - | 6.5 | 20 |
| 178-2 (Example 3) | - | Not measured | 25 |
| 178-3 (Example 4) | - | Not measured | 25 |
| 178-4 (Example 5) | - | Not measured | 25 |

TABLE I-continued

CARBON BLACK COLORING AGENT

| Pigment dispersion | Hegman Units | Time (min.) |
|---|---|---|
| 178-5 (Example 6) | Not measured | 25 |
| Control-1 (Comparative 1) | 6.8 | 25 |

[1]The pigment dispersions were no longer measured once the readings on the Hegman scale approached 8.0.

TABLE II

TITANIUM DIOXIDE COLORING AGENT

| Pigment dispersion | Hegman Units | Time (min.) |
|---|---|---|
| 170-2 (Example 7) | 7.4 | 5 |
| 170-3 (Example 8) | 6.5 | 5 |
| 170-4 (Example 9) | 6.4 | 5 |
| 170-5 (Example 10) | 8.0 | 5 |
| Control-2 (Comparative 2) | 3.6 | 5 |
| 170-2 (Example 7) | 7.6 | 10 |
| 170-3 (Example 8) | 7.4 | 10 |
| 170-4 (Example 9) | 7.3 | 10 |
| 170-5 (Example 10) | Not Measured[2] | 10 |
| Control-2 (Comparative 2) | 3.6 | 10 |
| 170-2 (Example 7) | Not Measured | 15 |
| 170-3 (Example 8) | Not measured | 15 |
| 170-4 (Example 9) | Not measured | 15 |
| 170-5 (Example 10) | Not measured | 15 |
| Control-2 (Comparative 2) | 6.4 | 15 |
| 170-2 (Example 7) | Not measured | 20 |
| 170-3 (Example 8) | Not measured | 20 |
| 170-4 (Example 9) | Not measured | 20 |
| 170-5 (Example 10) | Not measured | 20 |
| Control-2 (Comparative 2) | 7.2 | 20 |
| 170-2 (Example 7) | Not measured | 25 |
| 170-3 (Example 8) | Not measured | 25 |
| 170-4 (Example 9) | Not measured | 25 |
| 170-5 (Example 10) | Not measured | 25 |
| Control-2 (Comparative 2) | 7.5 | 25 |

[2]The pigment dispersion samples were no longer measured once the readings on the Hegman scale reached approximately 8.0.

The following Examples 11–24 and Comparative Examples 3–5 illustrate the preparation of inks tested for color development. The esterification product utilized as the pigment dispersant in each formulation is identified by the alcohol and the styrene maleic anhydride copolymer used to form the ester. For example, the esterification product of SMA 1000 and stearyl alcohol is referred to as "SMA 1000/stearyl ester". The procedure of ASTM-D-1210-79 was used to determine the point at which the grinding stage of the formulation procedure was complete. Once the pigment dispersion preparation was completed, toluene and cobalt naphthenate were added to the formulation. The resulting mixture was used to prepare inks for color development measurement.

At this point in the formulation process, it is preferable to use an aliphatic hydrocarbon oil such as Magie 470 oil rather than toluene. Aliphatic hydrocarbon oils are slower to evaporate, therefore, for experimental purposes toluene was used. It should be noted that neither solvent remains in the final ink film.

Comparative Example 3 illustrates the formulation of a pigment dispersion without a pigment dispersant. The pigment is titanium dioxide.

Comparative Example 4 illustrates the formulation of a pigment dispersion without a pigment dispersant. The pigment is a red azo pigment, Lithol Rubine.

Examples 11–16 illustrate the formulation of Lithol Rubine pigment dispersions using a variety of preferred pigment dispersants.

Comparative Example 5 illustrates the formulation of a pigment dispersion without a pigment dispersant. The pigment is carbon black.

Examples 17–22 illustrate the formulation of carbon black dispersions with a variety of preferred dispersants.

Examples 23–24 illustrate the formulation of pigment dispersions with the SMA 3000/stearyl ester dispersant using a reduced amount of the pigment, Lithol rubine.

Comparative Example 3

Kronos 2020, a titanium dioxide coloring agent, was combined with Lawter 100-S, a lithographic varnish. The blend was then ground in a Cowles Dissolver and periodically subjected to a Hegman Grind Analysis according to ASTM D-1210-79 until a Hegman reading of 8 was approached. The results of the grind analysis are shown in Table III. After the grinding step was complete, cobalt naphthenate, in the form of a 6% by weight solution, and toluene were added to the mixture. The sample designation and formulation are shown in Table IV.

Comparative Example 4

Lithol Rubine, a red azo coloring agent, was combined with Lawter 100-S, a lithographic varnish. Ceramic beads were added to the mixture. The blend was ground in a bead mill and periodically subjected to a Hegman Grind Analysis according to ASTM D-1210-79 until a Hegman reading of 8 was approached. The results of the grind analysis are shown in Table III. After the grinding step was complete, the ceramic beads were separated from the pigment dispersion. Cobalt naphthenate, in the form of a 6% by weight solution, and toluene were added to the mixture. The sample designation and formulation are shown in Table V.

EXAMPLES 11–16

Lithol Rubine, a red azo coloring agent, was combined with Lawter 100-S, a lithographic varnish. A pigment dispersant in the form of a 30% by weight solution in boiled linseed oil and ceramic beads were added to the mixture. The blend was ground in a bead mill and periodically subjected to a Hegman Grind Analysis according to ASTM D-1210-79 until a Hegman reading of 8 was approached. The results of the grind analysis are shown in Table III. After the grinding step was complete, the ceramic beads were separated from the pigment dispersion. Cobalt naphthenate, in the form of a 6% by weight solution, and toluene were added to the mixture. The sample designation, formulation and the type of pigment dispersant used for each example are shown in Table V.

Comparative Example 5

Raven 1200, a carbon black coloring agent, was combined with Lawter 100-S, a lithographic varnish. Ceramic beads were added to the mixture. The blend was ground in a bead mill and periodically subjected to a Hegman Grind Analysis according to ASTM D-1210-79 until a Hegman reading of 8 was approached. The results of the grind analysis are shown in Table III. After the grinding step was complete, the ceramic beads were separated from the pigment dispersion. Cobalt naphthenate, in the form of a 6% by weight solution, and toluene were added to the mixture. The sample designation and formulation are shown in Table VI.

EXAMPLES 17–22

Raven 1200, a carbon black coloring agent, was combined with Lawter 100-S, a lithographic varnish. A pigment dispersant in the form of a 30% solution in boiled linseed oil and ceramic beads were added to the mixture. The blend was ground in a bead mill and periodically subjected to a Hegman Grind Analysis according to ASTM D-1210-79 until a Hegman reading of 8 was approached. The results of the grind analysis are shown in Table III. After the grinding step was complete, the ceramic beads were separated from the pigment dispersion. Cobalt naphthenate, in the form of a 6% by weight solution, and toluene were added to the mixture. The sample designation, formulation and the type of pigment dispersant used for each example are shown in Table VI.

EXAMPLES 23–24

Lithol Rubine pigment dispersions were prepared with varying amounts of pigment. The procedure used is described in Examples 11–16. The results of the grind analysis are shown in Table III. The sample designation, formulation and type of pigment dispersant used for each example are shown in Table VII.

TABLE III

Hegman Grind Analysis Results For Comparative Examples 3–5 and Examples 11–24

| Coloring Agent | Example Number | Sample Designation | Hegman Units | Time (Min.) |
|---|---|---|---|---|
| Kronos 2020, Titanium Dioxide | Comparative 3 | 141-A1 | 0.0 | 0 |
| | | | 4.0 | 3 |
| | | | 6.0 | 6 |
| | | | 7.5 | 9 |
| | | | 8.0 | 12 |
| Lithol Rubine 57.1, Red Azo | Comparative 4 | 111-1 | 0 | 0 |
| | | | 4 | 2 |
| | | | 4.5 | 5 |
| | | | 5.0 | 7 |
| | | | 6.0 | 10 |
| | | | 8.0 | 12 |
| Lithol Rubine 57.1, Red Azo | 11 | 141-B1 | 0 | 0 |
| | | | 7.2 | 2 |
| | | | 8.0 | 4 |
| Lithol Rubine 57.1, Red Azo | 12 | 141-B2 | 0 | 0 |
| | | | 6.8 | 2 |
| | | | 8.0 | 4 |
| Lithol Rubine 57.1, Red Azo | 13 | 141-B3 | 0 | 0 |
| | | | 6.5 | 3 |
| | | | 8.0 | 5 |
| Lithol Rubine 57.1, Red Azo | 14 | 141-B4 | 0 | 0 |
| | | | 5.5 | 3 |
| | | | 6.25 | 5 |
| | | | 7.5 | 7 |
| | | | 8.0 | 9 |
| Lithol Rubine 57.1, Red Azo | 15 | 141-B5 | 0 | 0 |
| | | | 5 | 3 |
| | | | 6.5 | 5 |
| | | | 7.0 | 7 |
| | | | 8.0 | 9 |
| Lithol Rubine 57.1, Red Azo | 16 | 111-3 | 0 | 0 |
| | | | 7.0 | 3 |
| | | | 8.0 | 6 |
| Raven 1200, Carbon Black | Comparative 5 | 21-5 | 0.0 | 0 |
| | | | 1.5 | 2 |
| | | | 3.5 | 4 |
| | | | 4.3 | 6 |
| | | | 4.8 | 8 |
| | | | 5.2 | 11 |
| | | | 6.5 | 13 |
| | | | 7.3 | 16 |
| | | | 7.5 | 19 |
| | | | 7.7 | 22 |
| Raven 1200, Carbon Black | 17 | 141-C1 | 0 | 0 |
| | | | 6.8 | 1 |
| | | | 7.5 | 3 |
| | | | 8.0 | 5 |
| Raven 1200, Carbon Black | 18 | 141-C2 | 0 | 0 |
| | | | 4.8 | 1 |
| | | | 7.0 | 2 |
| | | | 7.6 | 3 |
| | | | 8.0 | 4 |
| Raven 1200, Carbon Black | 19 | 137-1 | 6 | 5 |
| | | | 8.0 | 10 |
| Raven 1200, Carbon Black | 20 | 137-2 | 6 | 5 |
| | | | 8.0 | 10 |
| Raven 1200, Carbon Black | 21 | 137-3 | 5.5 | 5 |
| | | | 8.0 | 10 |
| Raven 1200, Carbon Black | 22 | 21-6 | 0.0 | 0 |
| | | | 2.5 | 2 |
| | | | 4.2 | 4 |
| | | | 5.6 | 7 |
| | | | 8.0 | 9 |
| Lithol Rubine 57.1, Red Azo | 23 | 159-1 | 0 | 0 |
| | | | 5 | 2 |
| | | | 6.25 | 4 |
| | | | 7.0 | 6 |
| | | | 8.0 | 8 |
| Lithol Rubine 57.1, Red Azo | 24 | 159-2 | 0 | 0 |
| | | | 5.5 | 2 |
| | | | 6.0 | 4 |
| | | | 7.0 | 6 |
| | | | 8.0 | 8 |

TABLE IV

Sample Designation, Formulation and Type of Pigment Dispersant Used to Prepare Comparative Example 3 (Titanium Dioxide Coloring Agent)

| Example Number | Sample Designation | Quantity of Kronos 2020 (g) | Quantity of Lawter 100-S (g) | Quantity of Cobalt Naphthenate (g) | Quantity of Toluene (g) |
|---|---|---|---|---|---|
| Comparative 3 | 141-A1 | 200 | 100 | 2 | 22 |

TABLE V

Sample Designation, Formulation and Type of Pigment
Dispersant Used to Prepare Comparative Example 4 and Examples 11–16
(Lithol Rubine Coloring Agent)

| Example Number | Sample Designation | Quantity of Lithol Rubine (g) | Quantity of Lawter 100-S (g) | Type of Pigment Dispersant | Quantity of Pigment Dispersant (g) | Quantity of Ceramic Beads (g) | Quantity of Cobalt Naphthenate (g) | Quantity of Toluene (g) |
|---|---|---|---|---|---|---|---|---|
| Comparative 4 | 111-1 | 30 | 90 | None | 0 | 120 | 0.5167 | 15 |
| 11 | 141-B1 | 10 | 30 | SMA 3000/cetyl ester | 0.33 | 40 | 0.29 | 9.8 |
| 12 | 141-B2 | 10 | 30 | SMA 3000/cetyl-stearyl ester | 0.33 | 40 | 0.26 | 9 |
| 13 | 141-B3 | 10 | 30 | SMA 1000/oleyl ester | 0.33 | 40 | 0.28 | 9.75 |
| 14 | 141-B4 | 10 | 30 | SMA 1000/stearyl ester | 0.33 | 40 | 0.29 | 9 |
| 15 | 141-B5 | 10 | 30 | SMA 3000/oleyl ester | 0.33 | 40 | 0.29 | 9 |
| 16 | 111-3 | 12.5 | 37.5 | SMA 3000/stearyl ester | 0.42 | 50 | 0.24 | 6.2 |

TABLE VI

Sample Designation, Formulation and Type of Pigment
Dispersant Used to Prepare Comparative Example 5 and Examples 17–22
(Ravine 1200 Coloring Agent)

| Example Number | Sample Designation | Quantity of Raven 1200 (g) | Quantity of Lawter 100-S (g) | Type of Pigment Dispersant | Quantity of Pigment Dispersant (g) | Quantity of Ceramic Beads (g) | Quantity of Cobalt Naphthenate (g) | Quantity of Toluene (g) |
|---|---|---|---|---|---|---|---|---|
| Comparative 5 | 21-5 | 30 | 60 | None | 0 | 90 | 0.6 | 14 |
| 17 | 141-C1 | 15 | 30 | SMA 3000/cetyl ester | 0.5 | 45 | 0.28 | 8.0 |
| 18 | 141-C2 | 15 | 30 | SMA 3000/cetyl-stearyl ester | 0.5 | 45 | 0.29 | 8.0 |
| 19 | 137-1 | 30 | 60 | SMA 1000/oleyl ester | 1.0 | 90 | 0.6 | 14 |
| 20 | 137-2 | 30 | 60 | SMA 1000/stearyl ester | 1.0 | 90 | 0.6 | 14 |
| 21 | 137-3 | 30 | 60 | SMA 3000/oleyl ester | 1.0 | 90 | 0.6 | 14 |
| 22 | 21-6 | 30 | 60 | SMA 3000/stearyl ester | 1.0 | 90 | 0.6 | 14 |

TABLE VII

Sample Designation, Formulation and Type of Pigment
Dispersant Used to Prepare Examples 23–24
(Lithol Rubine Coloring Agent-Formulations with Reduced Pigment Levels)

| Example Number | Sample Designation | Quantity of Lithol Rubine (g) | Quantity of Lawter 100-S (g) | Type of Pigment Dispersant | Quantity of Pigment Dispersant (g) | Quantity of Ceramic Beads (g) | Quantity of Cobalt Naphthenate (g) | Quantity of Toluene (g) |
|---|---|---|---|---|---|---|---|---|
| 23 | 159-1 (10% less pigment) | 11.25 | 37.5 | SMA 3000/-stearyl ester | 0.375 | 48.75 | 0.36 | 6.68 |
| 24 | 159-2 (20% less pigment) | 10 | 37.5 | SMA 3000/-stearyl ester | 0.333 | 47.5 | 0.365 | 6.59 |

Color Development Test

1. Introduction

Color development measurements were performed according to ASTM procedure D-2244-93 "Standard Test Method for Calculation of Color Differences From Instrumentally Measured Color Coordinates" using a Hunter Labs Color Eye Colorimeter. This instrument measures the whiteness ("L"), the redness ("a") and the blueness ("b") of samples. Comparison of a treated sample to a control sample indicates the color difference ("delta E") between the two samples. Delta E is positive if the treated sample is darker than the control sample. The greater the delta E, the greater the color difference between the two samples.

The following color development test measurements show that the color development was improved when certain pigment dispersants of the present invention were incorporated into certain ink systems during the grinding stage. This translates into producing a finished ink having a deeper color or eliminating some of the pigment in the formulation to achieve the same color.

Samples for color development measurement were prepared according to ASTM procedure D 2066-91 "Standard Test Methods for Relative Tinting Strength of Printing Ink Dispersions" alternatively known as the "Bleach White Test".

A set of pink inks containing a red azo pigment, Lithol Rubine, and titanium dioxide pigment, a set of gray inks containing carbon black pigment and titanium dioxide pigment and a set of pink inks with a reduced quantity of red azo pigment and titanium dioxide were prepared. Each set contained a sample with no dispersing additive, the control, and samples with a variety of additives.

Drawdowns on Laneta charts were prepared from the mixtures by placing a portion of the ink at the top of the Laneta chart and pulling (drawing) down the ink with a #30 wire wound rod to produce a wet film with a thickness of 3 mils. The Laneta chart has a black half and a white half and the ink film covers both portions. For the pink inks, a higher color value was obtained on the film over the white portion. Therefore, all of the color development readings were taken over the black portion of the Laneta chart. For the gray inks, no differences were seen in the gray color development measurements when taken over the white and black areas of the chart.

Color developments measurements were performed using a Hunter Labs Color Eye Colorimeter. An average of three readings for "L", "a", "b", and "delta E" was obtained for each sample. The results of the observations are shown in Table XI, XII and XIII, entitled Results of Color Development Measurements for Test Set A, Results of Color Development Measurements for Test Set B, and Results of Color Development Measurements for Test Set C, respectively.

2. Color Development Test Set 1

Test Formulation A is a control sample which illustrates a procedure for color development measurement including preparation of a pink ink without a pigment dispersant in which the pigments are a mixture of a red azo pigment, Lithol Rubine, and titanium dioxide.

Test Formulations B–G are treated samples which illustrate a procedure for color development measurement including preparation of pink inks in which the pigments are a mixture of red azo pigment, Lithol Rubine, containing a variety of preferred dispersants and titanium dioxide without a pigment dispersant.

a. Test Formulation A (Control)

The pigment dispersions prepared in Comparative Examples 3 and 4 were used to prepare a pink ink for color development measurement. 14.85 grams of the white control pigment dispersion (141-A1) was combined with 0.15 grams of the red control pigment dispersion. The sample designation and red pigment dispersion designation are shown in Table VIII.

Drawdowns on Laneta charts were prepared from the mixture and color development measurements were performed on a Hunter Labs Color Eye Colorimeter. Results of the color development measurements are shown in Table XI.

b. Test Formulations B–G

The pigment dispersions prepared in Comparative Example 3 and Examples 11–16 were used to prepare pink inks for color development measurements. 14.85 grams of the white control pigment dispersion (141-A1) was combined with 0.15 grams of a red pigment dispersion. The sample designation, red pigment dispersion designation and type of pigment dispersant used for each test formulation are shown in Table VIII.

Drawdowns on Laneta charts were prepared from the mixtures and color development measurements were performed on a Hunter Labs Color Eye Colorimeter. Results of the color development measurements are shown in Table XI.

3. Color Development Test Set 2

Test Formulation H is a control sample which illustrates a procedure for color development measurement including preparation of a gray ink without a pigment dispersant in which the pigment is a mixture of a carbon black pigment and titanium dioxide pigment.

Test Formulations I–N are treated samples which illustrate a procedure for color development measurement including preparation of gray inks in which the pigments are a mixture of carbon black pigment containing a variety of preferred dispersants and titanium dioxide without a pigment dispersant.

a. Test Formulation H (Control)

The pigment dispersions prepared in Comparative Examples 3 and 5 were used to prepare a gray ink for color development measurements 14.85 grams of the white control pigment dispersion (141-A1) was combined with 0.15 grams of the black control pigment dispersion. The sample designation, and black pigment dispersion designation are shown in Table IX.

Drawdowns on Laneta charts were prepared from the mixture and color development measurements were performed on a Hunter Labs Color Eye Colorimeter. Results of the color development measurements are shown in Table XII.

b. Test Formulations I–N

The pigment dispersions prepared in Comparative Example 3 and Examples 17–22 were used to prepare gray inks for color development measurements. 14.85 grams of the white control pigment dispersion (141-A1) was combined with 0.15 grams of a black pigment dispersion. The sample designation, black pigment dispersion designation and type of pigment dispersant used for each test formulation are shown in Table IX.

Drawdowns on Laneta charts were prepared from the mixtures and color development measurements were performed on a Hunter Labs Color Eye Colorimeter. Results of the color development measurements are shown in Table XII.

4. Color Development Test Set 3

Test Formulations O–P are treated samples which illustrate a procedure for color development measurement including preparation of pink inks in which the pigments are a mixture of a red azo pigment, Lithol Rubine, containing SMA 3000/stearyl ester dispersant and a reduced quantity of the red azo pigment, and titanium dioxide without a pigment dispersant. Control Test Formulation A from Color Development Test Set A was used as the control for this set.

a. Test Formulations O–P

The pigment dispersions prepared in Comparative Example 3 and Examples 23 and 24 were used to prepare pink inks for color development measurements as described in Test Formulations B–G. The sample designation, red pigment dispersion designation and type of pigment dispersant used for each test formulation are shown in Table X. Results of the color development measurements are shown in Table XIII.

TABLE VIII

Inks Prepared For Color Development Measurements
Sample Designation, Red Pigment Dispersion Designation
and Type of Pigment Dispersant
Used to Prepare Set 1 (Test Formulations A–G)
(Lithol Rubine Coloring Agent)

| Test Formulation Designation | Sample Designation | Type of Pigment Dispersant | Red Pigment Dispersion Designation |
|---|---|---|---|
| A (Control) | 145-1 | None | 111-1 (Red Control) (Comparative Example 4) |
| B | 145-2 | SMA 1000/oleyl ester | 141-B3 (SMA 1000/oleyl ester) (Example 13) |
| C | 145-3 | SMA 1000/stearyl ester | 141-B4 (SMA 1000/stearyl ester) (Example 14) |
| D | 145-4 | SMA 3000/oleyl ester | 141-B5 (SMA 3000/oleyl ester) (Example 15) |
| E | 145-5 | SMA 3000/stearyl ester | 111-3 (SMA 3000/stearyl ester) (Example 16) |
| F | 145-6 | SMA 3000/cetyl ester | 141-B1 (SMA 3000/cetyl ester) (Example 11) |
| G | 145-7 | SMA 3000/cetyl-stearyl ester | 141-B2 (SMA 3000/cetyl-stearyl ester) (Example 12) |

TABLE IX

Inks Prepared For Color Development Measurements
Sample Designation, Black Pigment Dispersion Designation
and Type of Pigment Dispersant
Used to Prepare Set 2 (Test Formulations H–N)
(Raven 1200 Coloring Agent)

| Test Formulation Designation | Sample Designation | Type of Pigment Dispersant | Black Pigment Dispersion Designation |
|---|---|---|---|
| H (Control) | 145-8 | None | 21-5 (Black Control) (Comparative Example 5) |
| I | 145-9 | SMA 3000/cetyl ester | 141-C1 (SMA 3000/cetyl ester) (Example 17) |
| J | 145-10 | SMA 3000/cetyl-stearyl ester | 141-C2 (SMA 3000/cetyl-stearyl ester) (Example 18) |
| K | 150-2 | SMA 1000/oleyl ester | 137-1 (SMA 1000/oleyl ester) (Example 19) |
| L | 150-3 | SMA 1000/stearyl ester | 137-2 (SMA 1000/stearyl ester) (Example 20) |
| M | 150-4 | SMA 3000/oleyl ester | 137-3 (SMA 3000/oleyl ester) (Example 21) |
| N | 150-5 | SMA 3000/stearyl ester | 21-6 (SMA 3000/stearyl ester) (Example 22) |

TABLE X

Inks Prepared For Color Development Measurements
Sample Designation, Red Pigment Dispersion Designation
and Type of Pigment Dispersant
Used to Prepare Set 3 (Test Formulations O–P)
(Lithol Rubine Coloring Agent-Pigment Dispersions
with Reduced Pigment)

| Test Formulation Designation | Sample Designation | Type of Pigment Dispersant | Red Pigment Dispersion Designation |
|---|---|---|---|
| O | 159-3 | SMA 3000/stearyl ester | 159-1 (Red with 10% less pigment) (Example 23) |
| P | 159-4 | SMA 3000/stearyl ester | 159-2 (Red with 20% less pigment) (Example 24) |

TABLE XI

Results of Color Development Measurements for Set 1 (Test Formulations A–G)

| Test Formulation Designation | Sample Designation | Ink Color | Pigment Dispersant | L | a | b | delta E | Comments |
|---|---|---|---|---|---|---|---|---|
| A (Control) | 145-1 | Pink | None | 78.23 | 21.33 | −10.79 | — | — |
| B | 145-2 | Pink | SMA 1000/oleyl ester | 77.02 | 22.65 | −11.34 | 1.87 | Sample is darker, redder and bluer |
| C | 145-3 | Pink | SMA 1000/stearyl ester | 77.49 | 22.59 | −11.15 | 1.50 | Sample is darker, redder and bluer |
| D | 145-4 | Pink | SNA 3000/oleyl ester | 77.30 | 23.07 | −11.28 | 2.04 | Sample is darker, redder and bluer |
| E | 145-5 | Pink | SMA 3000/stearyl ester | 77.03 | 23.51 | −11.05 | 2.50 | Sample is darker, redder and bluer |
| F | 145-6 | Pink | SMA 3000/cetyl ester | 77.26 | 23.02 | −10.97 | 1.96 | Sample is darker, redder and bluer |
| G | 145-7 | Pink | SMA 3000/cetyl-stearyl ester | 77.35 | 22.69 | −11.04 | 1.64 | Sample is darker, redder and bluer |

TABLE XII

Results of Color Development Measurements for Set 2 (Test Formulations H–N)

| Test Formulation Designation | Sample Designation | Ink Color | Pigment Dispersant | L | a | b | delta E | Comments |
|---|---|---|---|---|---|---|---|---|
| H (Control) | 145-8 | Gray | None | 67.46 | −1.37 | −3.98 | — | — |
| I | 145-9 | Gray | SMA 3000/cetyl ester | 68.20 | 1.53 | −4.13 | −0.74 | Sample is lighter, less red and bluer |
| J | 145-10 | Gray | SMA 3000/cetyl-stearyl ester | 66.95 | 1.50 | −4.19 | 0.57 | Sample is darker, less red and bluer |
| K | 150-2 | Gray | SMA 1000/oleyl ester | 65.22 | −1.39 | −4.08 | 2.24 | Sample is darker, equal red and bluer |
| L | 150-3 | Gray | SMA 1000/stearyl ester | 67.00 | −1.32 | −3.86 | 0.48 | Sample is darker, equal red and less blue |
| M | 150-4 | Gray | SMA 3000/oleyl ester | 66.77 | −1.40 | −3.98 | 0.69 | Sample is darker, equal red and equal blue |
| N | 150-5 | Gray | SMA 3000/stearyl ester | 67.97 | −1.40 | −4.13 | −0.53 | Sample is lighter, equal red and bluer |

TABLE XIII

Test Results for Color Development Measurements for Set 3 (Test Formulations A, O, P)

| Test Formulation Designation | Sample Designation | Ink Color | Pigment Dispersant | L | a | b | delta E | Comments |
|---|---|---|---|---|---|---|---|---|
| A (Control) | 145-1[3] | Pink | None | 77.99 | 22.08 | −10.52 | — | — |
| O | 159-3 (10% less pigment) | Pink | SMA 3000/stearyl ester | 77.65 | 22.27 | −11.02 | 0.63 | Sample is darker, redder and bluer |
| P | 150-4 (20% less pigment) | Pink | SMA 3000/stearyl Sster | 78.13 | 21.82 | −10.84 | −0.43 | Sample is lighter, less red and bluer |

[3] A new measurement was made on the previously prepared card. The same card was used to obtain the measurements shown in Table XI.

As shown in Table XI, positive delta E values were obtained for all of the samples when the pigment dispersants of the present invention were incorporated into a Lithol Rubine ink system. This indicates that the color of the treated samples is darker than the control. As shown in Table XII, positive delta E values were obtained for carbon black ink systems containing SMA 3000/cetyl-stearyl ester, SMA 1000/oleyl ester, SMA 1000/stearyl ester and SMA 3000/oleyl ester, indicating that the color of these samples was darker than the control. Also as shown in Table XII, negative values were obtained for the carbon black ink systems containing SMA 3000/cetyl ester and SMA 3000/stearyl ester indicating that the color of these samples was lighter than the control. Finally, the results in Table XIII show that samples containing SMA 3000/stearyl ester and 10% and 20% less pigment produced a positive and a negative delta E, respectively. This indicates that the sample with 10% less pigment was darker than the control and the sample with 20% less pigment was lighter than the control. Therefore, a sample could contain approximately 15% less pigment and achieve the same color development.

These results indicate that when the dispersants of the present invention are incorporated into an ink during the grinding stage the color development is unexpectedly improved. A finished ink with a deeper color is produced. Alternatively, one may reduce the amount of pigment in the formulation to achieve the same color development.

The present invention may be embodied in other specific forms without departing from the spirit or essential attributes thereof and, accordingly, reference should be made to the appended claims, rather than to the foregoing specification, as indicating the scope of the invention.

We claim:

1. A lithographic printing ink composition comprising:

a) as a dispersant, at least one ester-modified carboxyl-containing copolymer being a reaction product of a long chain alcohol containing from 6 to 22 carbon atoms and a styrene maleic anhydride copolymer, wherein at least 35% of the carboxyl groups of the styrene maleic anhydride copolymer are esterified to form the reaction product;

(b) (i) a solvent selected from the group consisting of aliphatic hydrocarbons, aromatic hydrocarbons, and mixtures thereof; or (ii) a modifying oil selected from the group consisting of animal oils, vegetable oils, and mixtures thereof; or (iii) a combination of (i) and (ii);

(c) a liquid carrier resin selected from the group consisting of alkyd resins, phenolic resins, and mixtures thereof; and (d) at least one pigment.

2. A lithographic printing ink as defined in claim 1 wherein the long chain alcohol is a straight or branched $C_{10-22}$ monohydric alcohol.

3. A lithographic printing ink as defined in claim 2 wherein the long chain alcohol is a straight or branched $C_{12-18}$ monohydric alcohol.

4. A lithographic printing ink as defined in claim 3 wherein the long chain alcohol is selected from the group consisting of cetyl alcohol, oleyl alcohol, stearyl alcohol, and mixtures thereof.

5. A lithographic printing ink as defined in claim 1 wherein the modifying oil is a linseed oil.

6. A lithographic printing ink as defined in claim 1 wherein at least approximately 40% of the carboxyl groups of the styrene maleic anhydride are esterified to form the ester-modified carboxyl-containing copolymer.

7. A lithographic printing ink as defined in claim 1 wherein the weight ratio of pigment to ester-modified carboxyl-containing copolymer is from approximately 300:1 to approximately 50:1.

8. A lithographic printing ink as defined in claim 7 wherein the weight ratio of pigment to ester-modified carboxyl-containing copolymer is from approximately 200:1 to approximately 75:1.

9. A lithographic printing ink as defined in claim 8 wherein the weight ratio of pigment to ester-modified carboxyl-containing copolymer is approximately 100:1.

10. A process for making an improved lithographic printing ink comprising:
   a) reacting a styrene maleic anhydride copolymer with a long chain alcohol containing from 6 to 22 carbon atoms to produce an ester-modified carboxyl-containing copolymer, wherein at least 35% of the carboxyl groups of the styrene maleic anhydride copolymer are esterified to form the ester-modified carboxyl-containing copolymer;
   b) combining the ester-modified carboxyl-containing copolymer with (i) a solvent selected from the group consisting of aliphatic hydrocarbons, aromatic hydrocarbons, and mixtures thereof; or (ii) a modifying oil selected from the group consisting of animal oils, vegetable oils, and mixtures thereof; or (iii) a combination of (i) and (ii) to form a solution of said ester-modified carboxyl-containing copolymer in said solvent or modifying oil;
   c) combining the solution from step (b) with at least one liquid carrier resin selected from the group consisting of alkyd resins, phenolic resins, and mixtures thereof, and at least one pigment.

11. A process as defined in claim 10 wherein the long chain alcohol is a straight or branched $C_{10-22}$ monohydric alcohol.

12. A process as defined in claim 11 wherein the long chain alcohol is a straight or branched $C_{12-18}$ monohydric alcohol.

13. A process as defined in claim 12 wherein the long chain alcohol is selected from the group consisting of cetyl alcohol, oleyl alcohol, stearyl alcohol, and mixtures thereof.

14. A process as defined in claim 10 wherein the modifying oil is linseed oil.

15. A process as defined in claim 10 wherein approximately 50% of the carboxyl groups of the styrene maleic anhydride copolymer are esterified to form the ester-modified carboxyl-containing copolymer.

16. A process as defined in claim 10 wherein the weight ratio of pigment to ester-modified carboxyl-containing copolymer is from approximately 300:1 to approximately 50:1.

17. A process as defined in claim 16 wherein the weight ratio of pigment to ester-modified carboxyl-containing copolymer is from approximately 200:1 to approximately 75:1.

18. A process as defined in claim 17 wherein the weight ratio of pigment to ester-modified carboxyl-containing copolymer is approximately 100:1.

* * * * *